United States Patent
Yang (10) Patent No.: US 11,894,763 B2
(45) Date of Patent: Feb. 6, 2024

(54) INVERTER PROTECTION DEVICE

(71) Applicant: LS ELECTRIC CO., LTD., Anyang-si (KR)

(72) Inventor: Jin Kyu Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 315 days.

(21) Appl. No.: 17/432,695

(22) PCT Filed: Jul. 11, 2019

(86) PCT No.: PCT/KR2019/008551
§ 371 (c)(1),
(2) Date: Aug. 20, 2021

(87) PCT Pub. No.: WO2020/171308
PCT Pub. Date: Aug. 27, 2020

(65) Prior Publication Data
US 2022/0200269 A1    Jun. 23, 2022

(30) Foreign Application Priority Data

Feb. 22, 2019   (KR) .......................... 10-2019-0021212

(51) Int. Cl.
*H02M 1/32*       (2007.01)
*H02H 7/122*      (2006.01)
*H02M 7/5395*     (2006.01)

(52) U.S. Cl.
CPC ............ *H02M 1/32* (2013.01); *H02H 7/1222* (2013.01); *H02M 7/5395* (2013.01)

(58) Field of Classification Search
CPC .... H02M 1/32; H02M 7/5395; H02M 1/0064; H02M 1/14; H02H 7/1222; H02P 29/0241
See application file for complete search history.

(56) References Cited

U.S. PATENT DOCUMENTS 5,831,405 A * 11/1998 Massie .................... G06F 1/206
                                                                  318/803
7,834,571 B2 * 11/2010 Lin .......................... H02P 8/36
                                                                  318/471
(Continued)

FOREIGN PATENT DOCUMENTS

EP         2947760 A1    11/2015
JP      2008079490 A      4/2008
(Continued)

OTHER PUBLICATIONS

International Search Report for related International Application No. PCT/KR2019/008551; report dated Aug. 27, 2020; (5 pages).
(Continued)

*Primary Examiner* — Kyle J Moody
(74) *Attorney, Agent, or Firm* — K&L Gates LLP (57) ABSTRACT

An inverter protection device is disclosed. An inverter protection device, which determines whether or not a pulse-width modulation (PWM) control signal provided to an inverter unit of an inverter is blocked in accordance with a voltage signal received from first and second switches of a safety relay which are parallelly connected, comprises: a first power switch which is switched to an on-state by means of a first voltage signal applied from the first switch; a second power switch which is switched to an on-state by means of a second voltage signal applied from the second switch; and a buffer unit which is on-off controlled in accordance with an output current of the first and second power switches and provides the PWM control signal to the inverter unit.

5 Claims, 5 Drawing Sheets

(56) References Cited

U.S. PATENT DOCUMENTS

| | | | |
|---|---|---|---|
| 9,300,238 B2 * | 3/2016 | Mizukami | H02P 23/00 |
| 10,742,138 B2 * | 8/2020 | Yang | H02M 7/4826 |
| 2012/0212076 A1 | 8/2012 | Lu et al. | |

FOREIGN PATENT DOCUMENTS

| | | | |
|---|---|---|---|
| JP | 2010104187 A | 5/2010 | |
| JP | 2012055125 A | 3/2012 | |
| JP | 2015046989 A | 3/2015 | |
| JP | 2016123262 A | 7/2016 | |
| KR | 20160141979 A | 12/2016 | |

OTHER PUBLICATIONS

Written Opinion for related International Application No. PCT/KR2019/008551; report dated Aug. 27, 2020; (4 pages).

* cited by examiner

FIG. 1

Prior Art

INVERTER PROTECTION DEVICE

CROSS-REFERENCE TO RELATED APPLICATIONS

The present application is a National Stage of International Application No. PCT/KR2019/008551 filed on Jul. 11, 2019, which claims the benefit of Korean Patent Application No. 10-2019-0021212, filed on Feb. 22, 2019, with the Korean Intellectual Property Office, the entire contents of each hereby incorporated by reference.

FIELD

The present disclosure relates to an inverter protection device, and more specifically to an inverter protection device capable of improving circuit stability.

BACKGROUND

In recent years, electric devices such as electric motors and the like have been widely supplied. At the same time, the possibility that the abnormal operation of electric devices may lead to serious accidents is increasing. Therefore, it is required to reduce the risk of accidents as low as possible.

In order to place these risks within the allowable range, the international standards are established. IEC61508 is a standard for electric devices, and IEC61800-5-2 is established as a standard for operational devices such as electric motors and the like.

When a safety signal is input, an inverter must not transmit power to a motor as defined in IEC61800-5-2.

Figure 1:
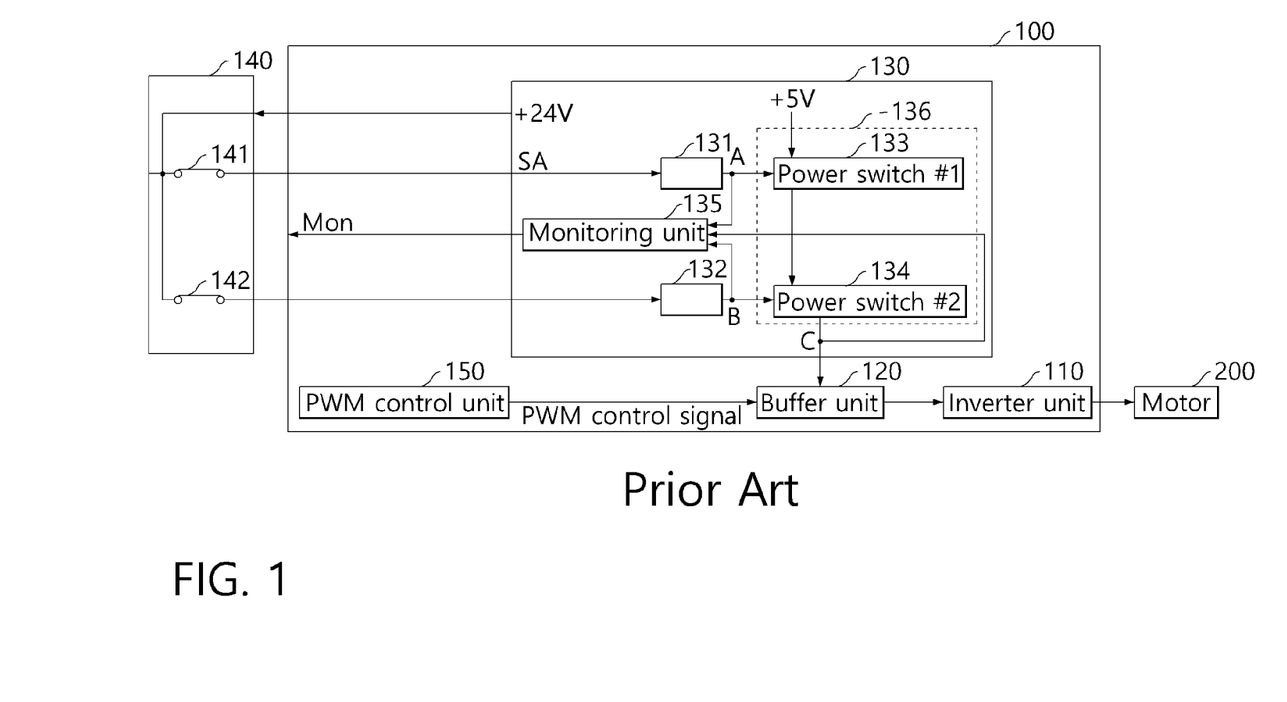
FIG. 1 is a configurational diagram of a conventional inverter protection device.

FIG. 1 is a configurational diagram of a conventional inverter protection device.

Referring to FIG. 1, the conventional inverter protection device 130 is provided inside an inverter 100 and may provide +24V power to a safety relay 140 disposed outside the inverter 100.

The safety relay 140 is configured with a first switch 141 and a second switch 142 arranged in parallel, and is in a closed state in the normal operating state.

A protection device 130 performs a protection operation to protect the inverter 100 when any one of the first and second switches 141 and 142 of the safety relay 140 opens a contact point by various safety operations of the inverter 100.

The safety operation of the inverter 100 may be performed by an upper control unit (not illustrated) or may be performed by a mechanical contact-point operation.

The inverter 100 is configured with a plurality of switching elements and includes an inverter unit 110 for outputting a DC link voltage as an AC voltage to provide the same to a motor, a PWM control unit 150 for outputting a pulse-width modulation (PWM) control signal to control the switching element of the inverter unit 110 to output an AC voltage in accordance with a command voltage, and a buffer unit 120 for providing the PWM control signal to the inverter unit 110.

The buffer unit 120 may apply a PWM control signal provided from the PWM control unit 150 to the gate of the switching element of the inverter unit 110. For example, it may be turned on or off by a power of 5V. That is, when 5V power is applied, it is in an on state and applies a PWM control signal to the inverter unit 110. If 5V power is not applied, it is in an off state and the PWM control signal cannot be applied to the inverter unit 110.

The inverter protection device 130 is configured with a first insulating unit 131, a second insulating unit 132, a first power switch 133, a second power switch 134, and a monitoring unit 135.

The first insulating unit 131 may insulate a voltage signal applied from the first switch 141. The second insulating unit 132 may also insulate a voltage signal applied from the second switch 142. Herein, insulation means to prevent direct power transfer between the input side and the output side for safety and to block an abnormal voltage. The first insulating unit 131 and the second insulating unit 132 each include a photocoupler, and power is connected to the secondary side.

The first and second power switches 133 and 134 use the secondary-side voltage of each of the first and second insulating units 131 and 132 as a control voltage to be in a closed or open state.

The first and second power switches 133 and 134 of the power switch unit 136 may be connected in series, respectively, and may be respectively connected in series with a 5V power line. That is, when a control voltage is applied from the first and second switches 141 and 142, the first and second power switches 133 and 134 are in an on state, and 5V power is applied to the buffer unit 120.

The buffer unit 120 is in an on state when a power of 5V is supplied and applies a PMW control signal applied from the PWM control unit 150 to the inverter unit 110.

If 5V power is not supplied to the buffer unit 120, it is switched to an off state. It is in a state where the PWM control signal applied from the PWM control unit 150 is not applied to the inverter unit 110.

The monitoring unit 135 determines whether the voltage signals of node A, node B and node C are normal. Node A is positioned between the first insulating unit 131 and the first power switch 133. Node B is positioned between the second insulating unit 132 and the second power switch 134, and node C is positioned on a power line between the second power switch 134 and the buffer unit 120.

As such, in the conventional inverter protection circuit, the first power switch 133 and the second power switch 134 are connected in series with each other, and when at least one of the first power switch 133 or the second power switch 134 is in an open state, it is configured to block the power supply to the buffer unit 120.

As described above, the secondary-side voltages of the first insulating unit 131 and the second insulating unit which are photocouplers act as control voltages of the first power switch 133 and the second power switch 134.

The entire circuit constituting the conventional inverter protection device uses the same ground potential, but the first power switch 133 and the second power switch 134 are connected in series such that the first power switch 133 may be in a state where the ground potential is unstable.

For example, in a state where the second power switch 134 is in a closed state, the ground potential of the first power switch 133 may become the same ground potential as that of the buffer unit 120 applied through the second power switch 134 to perform stable operation. However, in a state where the second power switch 134 is in an open state, the ground potential of the first power switch 133 is in a floating state, and there has been a problem in that even if the secondary-side voltage of the first insulating unit 131 is applied at 5V to the first power switch 133, normal operations may not occur.

SUMMARY

The technical problem to be solved by the present disclosure is to provide an inverter protection device capable of improving circuit stability by preventing the floating state of a ground potential.

An inverter protection device of the present disclosure for solving the above technical problem, which determines whether or not a pulse-width modulation (PWM) control signal provided to an inverter unit of an inverter is blocked in accordance with a voltage signal received from first and second switches of a safety relay which are parallelly connected, includes a first power switch which is switched to an on-state by means of a first voltage signal applied from the first switch, a second power switch which is switched to an on-state by means of a second voltage signal applied from the second switch, and a buffer unit which is on-off controlled in accordance with an output current of the first and second power switches and provides the PWM control signal to the inverter unit.

In an exemplary embodiment of the present disclosure, the buffer unit may include a first buffer for receiving power in a turned-on state of the first power switch and a second buffer for receiving power in a turned-on state of the second power switch, wherein the first buffer and the second buffer may be serially connected between a pulse-width modulation control unit for outputting the pulse-width modulation control signal and the inverter.

In an exemplary embodiment of the present disclosure, the inverter protection device may further include a first insulating unit and a second insulating unit respectively positioned between the first switch and the first power switch and between the second switch and the second power switch to insulate a first voltage signal and a second voltage signal, respectively.

In an exemplary embodiment of the present disclosure, the first power switch and the second power switch may be replaced with a first insulating power switch and a second insulating power switch for respectively insulating a first voltage signal and a second voltage signal, respectively.

In an exemplary embodiment of the present disclosure, the inverter protection device may further include a first filter unit and a second filter unit respectively positioned between the first power switch and the first buffer and between the second power switch and the second buffer to remove a switching ripple.

In an exemplary embodiment of the present disclosure, the inverter protection device may further include a first filter unit and a second filter unit respectively positioned between the first insulating power switch and the first buffer and between the second insulating power switch and the second buffer to remove a switching ripple.

By configuring power switches independently and serially connecting a plurality of buffers which are turned on by power transmitted through the power switches, the present disclosure has an effect of improving stability by preventing the ground potential of the power switches from floating.

EXPLANATION OF REFERENCE NUMERALS

| | |
|---|---|
| 1: Inverter | 2: Motor |
| 10: Inverter unit | 20: Buffer unit |
| 21: First buffer | 22: Second buffer |
| 30: Protection device | 31: First insulating unit |
| 32: Second insulating unit | 33: First power switch |
| 34: Second power switch | 35: Monitoring unit |
| 36: Power switch unit | 40: Safety relay |
| 41: First switch | 42: Second switch |
| 50: PWM control unit | |

DETAILED DESCRIPTION

In order to fully understand the configuration and effects of the present disclosure, preferred exemplary embodiments of the present disclosure will be described with reference to the accompanying drawings. However, the present disclosure is not limited to the exemplary embodiments disclosed below, and may be embodied in various forms and various modifications may be made. Simply, the description of the present exemplary embodiments is provided such that the disclosure of the present disclosure is complete, and to fully inform the scope of the disclosure to those of ordinary skill in the art to which the present disclosure pertains. In the accompanying drawings, components are enlarged in size compared to the reality for convenience of description, and the ratio of each component may be exaggerated or reduced.

Terms such as 'first' and 'second' may be used to describe various components, but the above components should not be limited by the above terms. The above terms may only be used for the purpose of distinguishing one component from another. For example, without departing from the scope of the present disclosure, a 'first component' may be referred to as a 'second component', and similarly, a 'second component' may also be referred to as a 'first component.' In addition, the singular expression includes the plural expression unless the context clearly dictates otherwise. Unless defined otherwise, terms used in the exemplary embodiments of the present disclosure may be interpreted as meanings commonly known to those of ordinary skill in the art.

Hereinafter, an inverter protection device according to an exemplary embodiment of the present disclosure will be described with reference to the drawings.

Figure 2:
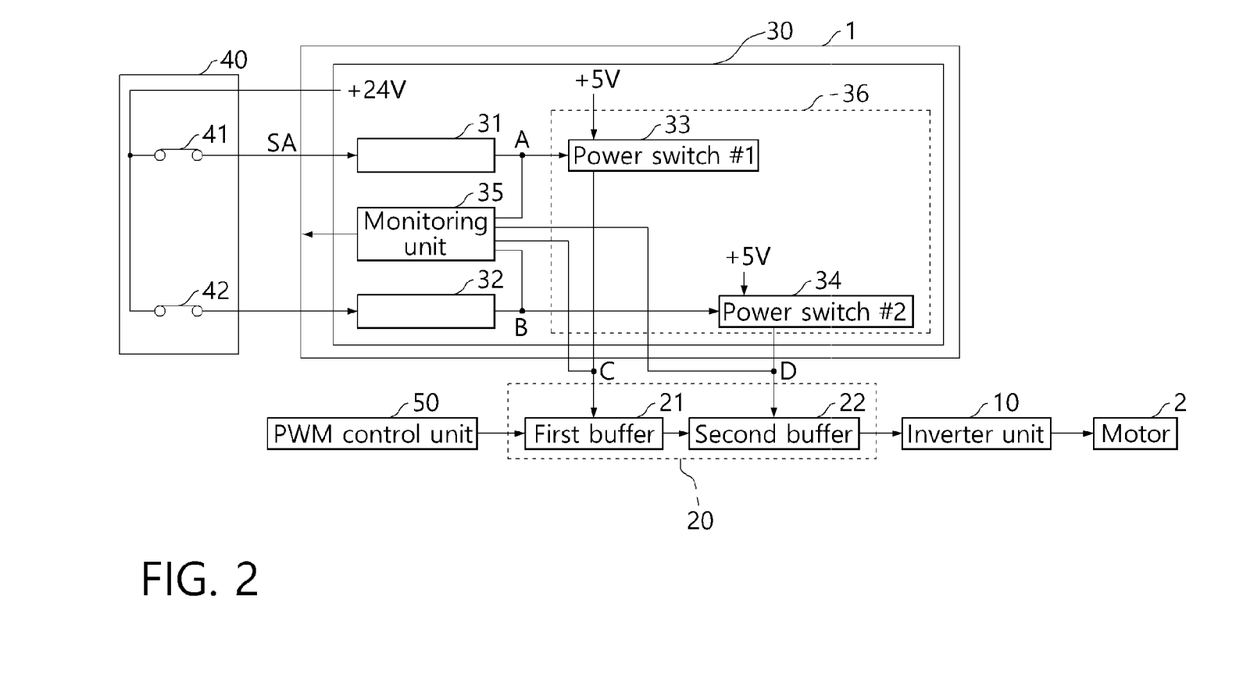
FIG. 2 is a block configurational diagram of an inverter protection device according to a preferred exemplary embodiment of the present disclosure.

FIG. 2 is a block configurational diagram of an inverter protection device according to a preferred exemplary embodiment of the present disclosure.

Referring to FIG. 2, the inverter protection device 30 of the present disclosure may be provided inside an inverter 1 and provide +24V power to a safety relay 40 disposed outside the inverter 1. However, this is an example, and depending on the settings such as the rated voltage of the inverter 1 and the like, a voltage having a size different from 24V may be provided, and power may be provided from the outside of the inverter 1.

The safety relay 40 may include a first switch 41 and a second switch 42 arranged in parallel. The safety relay 40 is closed in the normal operating state.

The safety relay 40 is a relay manufactured according to the safety standards of relays in order to strengthen the safety of various mechanical devices, and since the configuration is as well known in the relevant technical field, a detailed description thereof will be omitted.

The protection device 30 of the present disclosure performs a protection operation to protect the inverter 1 when any one of the first and second switches 41 and 42 of the safety relay 40 opens a contact point by various safety operations of the inverter 1.

The safety operation of the inverter 1 may be performed by an upper control unit (not illustrated), or may be performed by a mechanical contact-point operation.

In an exemplary embodiment of the present disclosure, the inverter 1 may be configured with a plurality of switching elements and may include an inverter unit 10 for outputting a DC link voltage as an AC voltage to provide the same to a motor, a PWM control unit 50 for outputting a pulse-width modulation (PWM) control signal to control the switching element of the inverter unit 10 to output an AC voltage in accordance with a command voltage, and a buffer unit 20 for providing the PWM control signal to the inverter unit 10.

The switching element of the inverter unit 10 may be, for example, an IGBT, but the present disclosure is not limited thereto, and various power semiconductor switching elements may be used.

The buffer unit 20 may apply a PWM control signal provided from the PWM control unit 50 to the gate of the switching element of the inverter unit 10. For example, it may be in an on or off state by a power of 5V. That is, when 5V power is applied, it may be in an on state to apply a PWM control signal to the inverter unit 10, and when 5V power is not applied, it may be in an off state and the PWM control signal may not be applied to the inverter unit 10.

The buffer unit 20 may be a gate block.

In an exemplary embodiment of the present disclosure, the inverter protection device 30 may include a first insulating unit 31, a second insulating unit 32, a first power switch 33, a second power switch 34, and a monitoring unit 35.

The first insulating unit 31 may insulate a voltage signal applied from the first switch 41. The second insulating unit 32 may also insulate a voltage signal applied from the second switch 42.

Herein, insulation means to prevent direct power transfer between the input side and the output side for safety and to block an abnormal voltage.

The first insulating unit 31 and the second insulating unit 32 may each be a photocoupler.

The first and second power switches 33 and 34 may be, for example, metal-oxide-semiconductor field-effect transistors (MOSFETs), but the present disclosure is not limited thereto, and various power semiconductor switches may be used.

The first and second power switches 33 and 34 are conducted by the secondary-side voltage of the first insulating unit 31 and the second insulating unit 32. In this case, the secondary-side voltage of the first insulating unit 31 and the second insulating unit 32 may be a voltage signal higher than the threshold voltage of the first and second power switches 33 and 34.

It is assumed that the first and second power switches 33 and 34 are selectively controlled by the buffer unit 20 by switching a power of 5V, respectively. The first power switch 33 and the second power switch 34 are positioned in an independent state without any mutual coupling relationship. In addition, the buffer unit 20 includes a first buffer 21 that selectively receives a 5V voltage through the first power switch 33 to be on-off controlled, and a second buffer 22 that selectively receives a 5V voltage through the second power switch 34 to be on-off controlled.

The first buffer 21 and the second buffer 22 are connected in series between the PWM control unit 50 and the inverter unit 10.

Therefore, in a state where both the first power switch 33 and the second power switch 34 are in a closed state, a 5V power voltage may be supplied to each of the first buffer 21 and the second buffer 22 such that the PWM control signal of the PWM control unit 50 is provided to the inverter unit 10.

When at least one of the first power switch 33 and the second power switch 34 is in an open state, it may block the PWM control signal of the PWM control unit 50 from being provided to the inverter unit 10.

The monitoring unit 35 determines whether the voltage signals of node A, node B, node C and node D operate in the normal state. Node A is positioned between the first insulating unit 31 and the first power switch 33. Node B is positioned between the second insulating unit 32 and the second power switch 34. Node C is positioned on a power line between the first power switch 33 and the first buffer 21. Node D is positioned on a power line between the second power switch 34 and the second buffer 22.

The monitoring unit 35 may include, for example, an AND gate which is a logic gate, and when any one of the voltage signals of nodes A, B, C and D above is a fault, a monitoring signal that notifies a fault of the circuit may be provided to the outside. For example, the monitoring signal may be provided to an external user terminal through a communication line.

In addition, if the inverter 1 is provided with a human-machine interface (HMI) or a programmable logic controller (PLC), it may be possible to provide monitoring signals to the HMI or PLC.

In an exemplary embodiment of the present disclosure, the monitoring unit 35 may determine whether a voltage signal is normally applied in each node, that is, whether a normal state operation is being performed. It does not determine the fault of each element.

That is, the monitoring unit 35 will be able to reflect and output the fault state of the protection device 30 inside the inverter 1.

In an exemplary embodiment of the present disclosure, although it is described as an example that the monitoring unit 35 outputs the normal state of each node of the protection device 30 as a monitoring signal through the AND gate, the present disclosure is not limited thereto. For example, a plurality of monitoring units may be disposed, each of which outputs a monitoring signal indicating the normal state of each node, and the HMI, PLC or external user terminal may check the state of the node corresponding to the monitoring signal, respectively.

As such, according to an exemplary embodiment of the present disclosure, the state of the circuit may be easily grasped through the monitoring unit 35.

Hereinafter, the operation of the protection device 30 of the present disclosure will be described in detail with reference to FIGS. 3 and 4.

Figure 3:
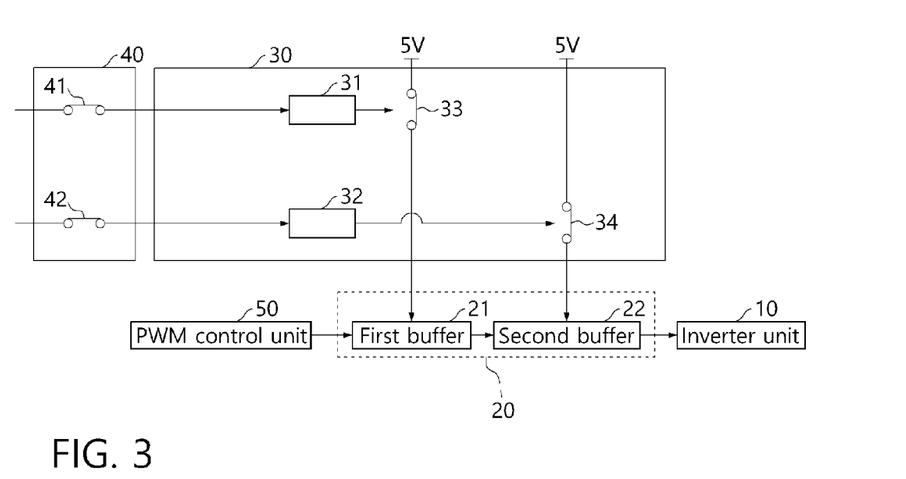
FIGS. 3 and 4 are each an operation explanatory diagram of the present disclosure.
Figure 4:
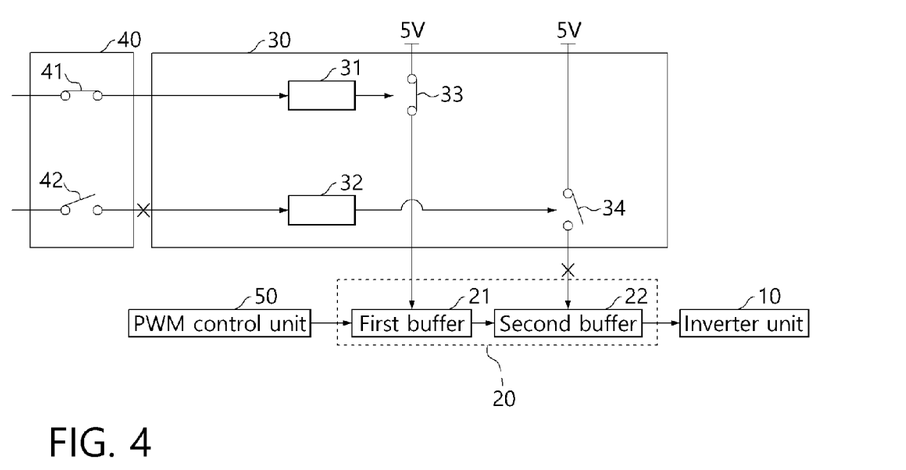

FIG. 3 is an exemplary diagram for explaining an operation when each voltage signal from the safety relay 40 is provided to the protection device 30, and FIG. 4 is an exemplary diagram for explaining an operation when the contact point of the second switch 42 of the safety relay 40 is opened in accordance with the safety operation.

Referring to FIG. 3, the voltage signal applied from the first switch 41 of the safety relay 40 is insulated by the first insulating unit 31, and the secondary-side voltage of the first insulating unit 31 is applied to the first power switch 33 such that the first power switch 33 is in an on state. In addition, the voltage signal applied from the second switch 42 of the safety relay 40 is insulated by the second insulating unit 32, and the secondary-side voltage of the second insulating unit 32 is applied to the second power switch 34 such that the second power switch 34 may be in an on state.

When the first power switch 33 and the second power switch 34 are in a closed stated, the first and second buffers 21 and 22 connected in series receive 5V power through the first power switch 33 and the second power switch 34, respectively, such that both are in an on state.

When the first and second buffers 21 and 22 connected in series of the buffer unit 20 are in an on state, the PWM control signal generated by the PWM control unit 50 is applied to the gate of the switching element of the inverter unit 10 through the buffer unit 20, whereby an AC signal may be output to the motor 2.

Referring to FIG. 4, when the second switch 42 of the safety relay 40 is turned off by the safety operation, since there is no voltage signal applied to the gate of the second power switch 34, the second power switch 34 is in an off state (open state).

As described above, in the prior art, when the second power switch 34 is in an open state, the ground potential of the first power switch 33 is floated.

However, in the present disclosure, since the first power switch 33 and the second power switch 34 have separate ground potentials, it is possible to prevent an unstable floating state.

That is, the voltage signal applied from the first switch 41 of the safety relay 40 is insulated by the first insulating unit 31 and applied to the first power switch 33, whereby the first power switch 33 may be stably in an on state.

Since the second power switch 34 is in an off state, it is possible to block the PWM control signal of the PWM control unit 50 from being supplied to the inverter unit 10 by blocking the supply of 5V power to the second buffer 22.

Figure 5:
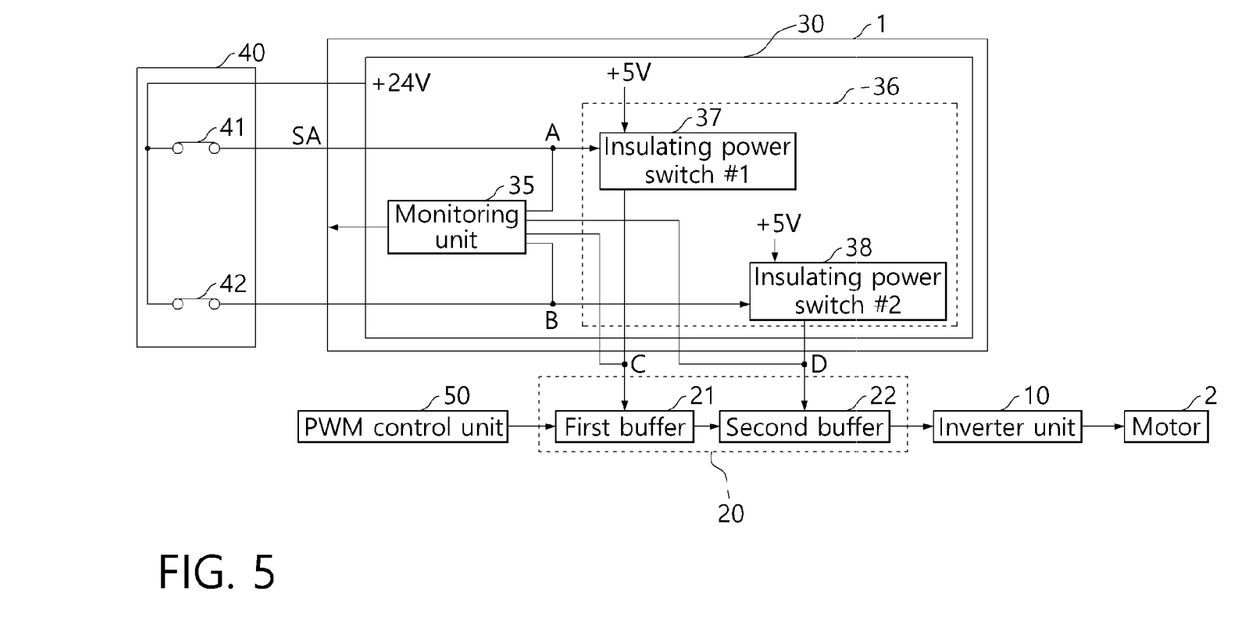
FIGS. 5 and 6 are each a block configurational diagram of an inverter protection device according to another exemplary embodiment of the present disclosure.

FIG. 5 is a block configurational diagram of an inverter protection device according to another exemplary embodiment of the present disclosure.

Referring to FIG. 5, the other configuration is the same as that of the inverter protection device described with reference to FIG. 2, but the first insulating unit 31 and the second insulating unit 32 are not used, and it may be configured by replacing the first power switch 33 and the second power switch 34 with a first insulating power switch 37 and a second insulating power switch 38 including an insulating function.

The first insulating power switch 37 and the second insulating power switch 38 may be a single module including a transistor in which a photocoupler is installed at a gate.

The first insulating power switch 37 and the second insulating power switch 38 are turned on or turned off in accordance with a voltage signal supplied through the first switch 41 and the second switch 42 of the safety relay 40, respectively, to supply and control 5V power to the first buffer 21 and the second buffer 22.

The specific operation is the same as that of the above-described exemplary embodiment, and it prevents the ground potential of the first insulating power switch 37 from being floated regardless of the operation state of the second insulating power switch 38 to perform stable operation.

Figure 6:
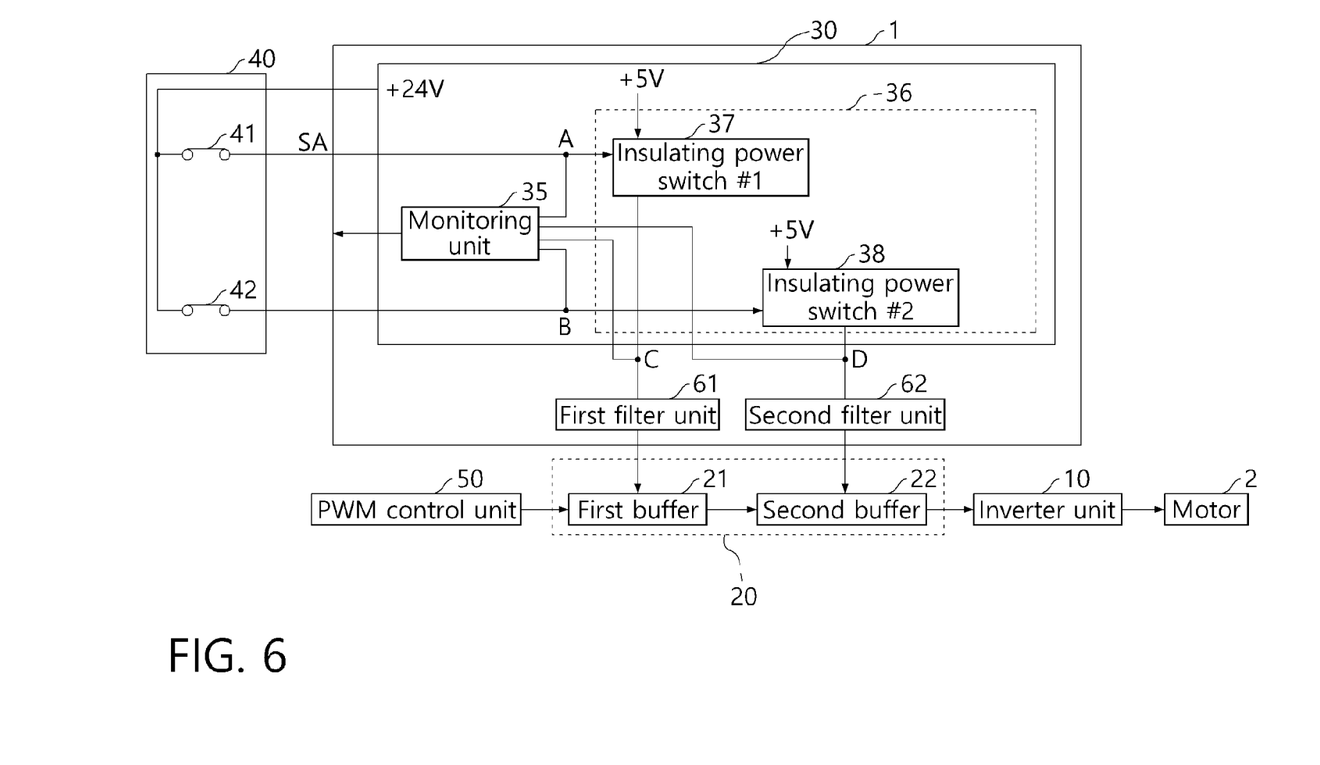

FIG. 6 is a block configurational diagram of an inverter protection device according to another exemplary embodiment of the present disclosure.

Referring to FIG. 6, the other configuration is the same as the example of the inverter protection device described with reference to FIG. 2, but it may be configured by further including a first filter unit 61 and a second filter unit 62 respectively positioned between the first buffer 21 and the first power switch 33, and between the second buffer 22 and the second power switch 34.

The first filter unit 61 and the second filter unit 62 remove a switching ripple of the first power switch 33 and the second power switch 34, respectively, to enable a stable supply of 5V power.

In addition, the first filter unit 61 and the second filter unit 62 may serve to compensate for a voltage drop due to a diode component of the first power switch 33 and the second power switch 34.

Although the exemplary embodiments according to the present disclosure have been described above, these are only exemplary, and those of ordinary skill in the art will understand that various modifications and exemplary embodiments of an equivalent range are possible therefrom. Therefore, the true technical protection scope of the present disclosure should be defined by the following claims.

The present disclosure has industrial applicability as a technology for preventing the floating state of an inverter using the laws of nature.

The invention claimed is:

1. An inverter protection device, which determines whether or not a pulse-width modulation (PWM) control signal provided to an inverter unit of an inverter is blocked in accordance with a voltage signal received from first and second switches of a safety relay which are parallelly connected, comprising:
    a first power switch which is switched to an on-state by means of a first voltage signal applied from the first switch;
    a second power switch which is switched to an on-state by means of a second voltage signal applied from the second switch; and
    a buffer unit which is on-off controlled in accordance with an output current of the first and second power switches and provides the PWM control signal to the inverter unit,
    wherein the buffer unit comprises a first buffer for receiving power in a turned-on state of the first power switch and a second buffer for receiving power in a turned-on state of the second power switch, and
    wherein the first buffer and the second buffer are serially connected between a pulse-width modulation control unit for outputting the pulse-width modulation control signal and the inverter.

2. The inverter protection device of claim 1, further comprising a first insulating unit and a second insulating unit respectively positioned between the first switch and the first power switch and between the second switch and the second power switch to insulate a first voltage signal and a second voltage signal, respectively.

3. The inverter protection device of claim 1, wherein the first power switch and the second power switch may be replaced with a first insulating power switch and a second insulating power switch for respectively insulating a first voltage signal and a second voltage signal, respectively.

4. The inverter protection device of claim 3, further comprising a first filter unit and a second filter unit respectively positioned between the first insulating power switch and the first buffer and between the second insulating power switch and the second buffer to remove a switching ripple.

5. The inverter protection device of claim 1, further comprising a first filter unit and a second filter unit respectively positioned between the first power switch and the first buffer and between the second power switch and the second buffer to remove a switching ripple.

\* \* \* \* \*